United States Patent
Shute et al.

(10) Patent No.: US 12,327,065 B2
(45) Date of Patent: Jun. 10, 2025

(54) RESOLVING CONFLICTING COMMANDS USING HIERARCHY

(71) Applicant: INTERNATIONAL BUSINESS MACHINES CORPORATION, Armonk, NY (US)

(72) Inventors: Michael Patrick Shute, Niantic, CT (US); Siddhartha Sood, Ghaziabad (IN); Suguna Kola, Hyderabad (IN); Gordan G. Greenlee, Endicott, NY (US)

(73) Assignee: International Business Machines Corporation, Armonk, NY (US)

( * ) Notice: Subject to any disclaimer, the term of this patent is extended or adjusted under 35 U.S.C. 154(b) by 677 days.

(21) Appl. No.: 17/457,236

(22) Filed: Dec. 1, 2021

(65) Prior Publication Data
US 2023/0168858 A1    Jun. 1, 2023

(51) Int. Cl.
G06F 3/16     (2006.01)
G06F 3/01     (2006.01)
G06N 20/00    (2019.01)

(52) U.S. Cl.
CPC .............. G06F 3/167 (2013.01); G06F 3/017 (2013.01); G06N 20/00 (2019.01)

(58) Field of Classification Search
CPC .................................. G06F 3/167; G06F 3/017
See application file for complete search history.

(56) References Cited

U.S. PATENT DOCUMENTS

| 6,023,673 A | 2/2000 | Bakis |
| 8,457,973 B2 | 6/2013 | Blanchard |
| 9,639,322 B2 | 5/2017 | Osawa |

(Continued)

FOREIGN PATENT DOCUMENTS

CN        201936600 U      8/2011

OTHER PUBLICATIONS

"Speech and Voice Recognition Market Is Set to Grow Blooming with Massive Gains Set to Be Met by 2030." OpenPR, InsightSLICE, Dec. 7, 2020, 12:28 PM CET, www.openpr.com/news/2203702/speech-and-voice-recognition-market-is-set-to-grow-blooming-with.

(Continued)

*Primary Examiner* — Ibrahim Siddo
(74) *Attorney, Agent, or Firm* — Daniel M. Yeates

(57) ABSTRACT

Embodiments include a method for controlling a device, a voice-controlled device, and a computer program product. One embodiment of the method may comprise receiving a first command from a first user at a device and receiving a second command from a second user at the device, and determining, by a first trained machine learning model, that the second command conflicts with the first command. In response to determining the second command conflicts with the first command, some embodiments may determine, by a second trained machine learning model, a physical world hierarchy between the first user and the second user, determine a response to the second command using the physical world hierarchy. The method may further comprise performing the response. Some embodiments may further comprise identifying, by the second trained machine learning model, a higher ranking user chosen from the group consisting of the first user and the second user.

18 Claims, 10 Drawing Sheets

(56) References Cited

U.S. PATENT DOCUMENTS

| | | | |
|---|---|---|---|
| 9,870,360 | B1 | 1/2018 | Bilinski |
| 9,900,171 | B2 | 2/2018 | Guedalia |
| 10,008,183 | B2 | 6/2018 | Ueda |
| 10,044,872 | B2 | 8/2018 | Guo |
| 10,938,830 | B2 | 3/2021 | Fox |
| 10,944,588 | B2 | 3/2021 | Yengar |
| 2013/0172022 | A1 | 7/2013 | Seymour |
| 2015/0181151 | A1 | 6/2015 | Nguyen |
| 2016/0093291 | A1 | 3/2016 | Kim |
| 2016/0315996 | A1 | 10/2016 | Ha |
| 2017/0076696 | A1 | 3/2017 | Yoshihiro |
| 2017/0103755 | A1 | 4/2017 | Jeon |
| 2017/0200112 | A1 | 7/2017 | Liu |
| 2017/0293851 | A1 | 10/2017 | Chawla |
| 2018/0096690 | A1 | 4/2018 | Mixter |
| 2018/0122378 | A1 | 5/2018 | Mixter |
| 2018/0181197 | A1* | 6/2018 | Teller ............... G10L 15/22 |
| 2018/0247065 | A1 | 8/2018 | Rhee |
| 2020/0177410 | A1* | 6/2020 | Iyengar ............... G06F 3/167 |

OTHER PUBLICATIONS

"Voice Assistant Application Market Growing at a CAGR 31.9% | Key Player IBM, Google, AWS, Microsoft, Apple Read More: Https://Www.digitaljournal.com/Pr/4904431#ixzz73vEijYwd." Digital Journal, GetNews, Dec. 5, 2020, www.digitaljournal.com/pr/4904431. Retrieved from the internet on Aug. 18, 2021.

Amazon, "Alexa Help Videos," https://www.amazon.com/gp/help/customer/display.html? hodeId=202016320&video_id=fb6b9752, printed Nov. 28, 2018, 2 pgs.

Mell et al., "The NIST Definition of Cloud Computing," Recommendations of the National Institute of Standards and Technology, U.S. Department of Commerce, Special Publication 800-145, Sep. 2011, 7 pgs.

Welch, C. , "Amazon's Alexa can now recognize different voices and give personalized responses," The Verge, https://www.theverge.com/circuitbreaker/2017/10/11/16460120/amazon-echo-multi-user-voice-new-feature, Oct. 11, 2017, 3 pgs.

* cited by examiner

RESOLVING CONFLICTING COMMANDS USING HIERARCHY

BACKGROUND

The present disclosure relates to computer security, and more specifically, to resolving conflicting commands using hierarchies.

The development of the EDVAC system in 1948 is often cited as the beginning of the computer era. Since that time, computer systems have evolved into extremely complicated devices. Today's computer systems typically include a combination of sophisticated hardware and software components, application programs, operating systems, processors, buses, memory, input/output devices, and so on. As advances in semiconductor processing and computer architecture push performance higher and higher, even more advanced computer software has evolved to take advantage of the higher performance of those capabilities, resulting in computer systems today that are much more powerful than just a few years ago.

One application of this new capacity is the "Internet of Things," or IoT. The IoT generally refers to an ad-hoc network of IoT devices, e.g., devices, vehicles, signs, buildings, and other items embedded with electronics, software, sensors, and/or actuators, plus network connectivity, which may enable these objects to collect and exchange data with other IoT devices and/or computer systems. The IoT allows objects to be sensed or controlled remotely across existing network infrastructure, creating opportunities for more direct integration of the physical world into computer-based systems, and resulting in improved efficiency, accuracy, and economic benefits, in addition to reduced human intervention. When IoT is augmented with sensors and actuators, the technology becomes an instance of the more general class of cyber-physical systems, also encompassing technologies such as smart grids, virtual power plants, smart homes, intelligent transportation, and smart cities. Each thing in such a system may be uniquely identifiable through its embedded computing system, and is able to interoperate within the existing Internet infrastructure.

SUMMARY

According to embodiments of the present disclosure, a method for controlling a device comprising receiving a first command from a first user at a device and receiving a second command from a second user at the device, and determining, by a first trained machine learning model, that the second command conflicts with the first command. In response to determining the second command conflicts with the first command, some embodiments may determine, by a second trained machine learning model, a physical world hierarchy between the first user and the second user, determine a response to the second command using the physical world hierarchy. The method may further comprise performing the response. Some embodiments may further comprise identifying, by the second trained machine learning model, a higher ranking user chosen from the group consisting of the first user and the second user.

According to embodiments of the present disclosure, a voice-controlled device, comprising a processing unit, and a memory coupled to the processing unit. The memory may contain program instructions executable by the processing unit to cause the processing unit to receive a first command from a first user, receive a second command from a second user, and determine, by a first trained machine learning model, that the second command conflicts with the first command. The memory may further contain program instructions to, in response to determining the second command conflicts with the first command, determine, by a second trained machine learning model, a physical world hierarchy between the first user and the second user, and determine a response to the second command using the physical world hierarchy. The memory may further contain program instructions to perform the response and to identify, by the second trained machine learning model, a higher ranking user chosen from the group consisting of the first user and the second user.

According to embodiments of the present disclosure, a computer program product for voice-controlled device, the computer program product comprising a computer readable storage medium having program instructions embodied therewith. The program instructions may be executable by a processor to cause the processor to receive a first command from a first user, receive a second command from a second user, and determine, by a first trained machine learning model, that the second command conflicts with the first command. The program instructions may further cause the processor to, in response to determining the second command conflicts with the first command, determine, by a second trained machine learning model, a physical world hierarchy between the first user and the second user, and determine a response to the second command using the physical world hierarchy. The program instructions may further cause the processor to perform the response. The program instructions may further cause the processor to identify, by the second trained machine learning model, a higher ranking user chosen from the group consisting of the first user and the second user.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
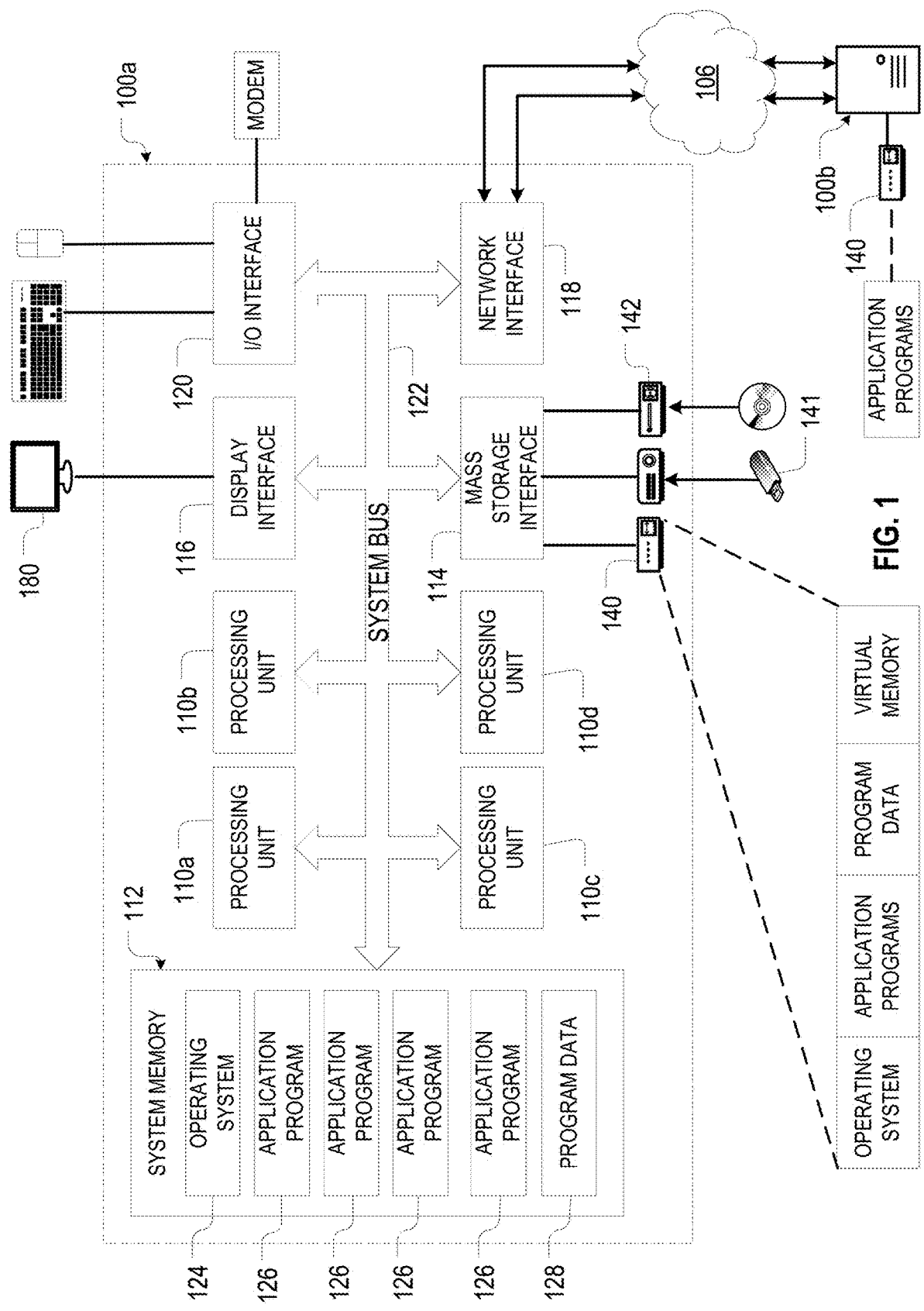
FIG. 1 depicts the representative major components of a computer system that may be used in accordance with embodiments of the present disclosure.

While the disclosure is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to computer security; more particular aspects relate to resolving conflicting commands using hierarchies. While the present disclosure is not necessarily limited to such applications, various aspects of the disclosure may be appreciated through a discussion of various examples using this context.

Many IoT devices are deployed for purposes and/or in environments in which they can be provided with a plurality of inputs by multiple parties at approximately the same times, e.g., adapted to receive commands via voice control from anyone near the IoT device. As a result, these IoT devices may need to manage conflicting commands. For example, a conflict may arise if a first user commands a smart speaker (i.e., a common IoT device) to play classical music, and shortly thereafter, a second user commands the smart speaker to play rock music.

One possible approach to this problem is to process all of the commands, i.e., to resolve the conflict by always executing the later-issued command. This approach, however, may lead to challenges in the real world, where a command from someone higher up in a real world hierarchy may be overridden by someone lower down in the hierarchy. An example of such a hierarchy-based conflict may be a parent asking a smart speaker to play educational content then, after the content is started, a child giving the smart speaker a command to play jingles. In the 'process all commands' approach, the smart speaker would immediately process the second command, which will result in stopping the educational content. This resolution may upset the parent, and when happening constantly, the parent may turn off the smart speaker. This reaction, in turn, may aggravate the child because nothing is playing anymore.

Some conflicts may occur even between commands issued at distinctly different times. For example, in a manufacturing scenario, a senior engineer may give a command that a certain switch must remain closed during a maintenance procedure. A conflict with that command will occur if a junior engineer subsequently gives a command to open that same switch. That is, even though the second command may occur hours later, it violates a scope that has been set by the first command, and hence, should be treated as conflicting.

Accordingly, the IoT systems in some embodiments of the present disclosure include logic that can determine how to identify and resolve conflicting commands using the context of the command(s) and physical-world hierarchical relationship(s) between the users who issued those commands. In some embodiments, an IoT device may receive a first command from a first user. For example, an IoT device may receive a voice command via a microphone communicatively coupled to the IoT device. After receiving the first command, the IoT device may receive a second command from a second user, e.g., via the microphone. The IoT system (e.g., the IoT device and/or a cloud processing server) may analyze the commands to determine whether or not the commands conflict given the context of those commands.

The IoT system may then resolve any identified conflict based at least in part on a physical-world hierarchy between the users.

The IoT system in some embodiments may first analyze the received commands using, e.g., natural language processing (NLP), which may convert the commands into a string of machine instructions. The IoT system may then analyze the strings of machine instructions to determine whether or not the strings of machine instructions conflict given the context of the two commands (e.g., if the associated IoT device is unable to execute both commands simultaneously, if the second command would reverse or undo the first command, etc.) If a conflict is found, the IoT system may determine a response to the second command based at least in part on the physical-world hierarchy between the users who issued the commands. The response may include performing the second command, ignoring the second command, or performing an alternate response. The alternate response may include seeking approval from the higher-ranking user or partially performing the second command.

Some embodiments may determine whether or not a conflict exists by examining the context of the commands. For example, if a first command instructs an IoT device to add an item to a grocery list, a second command may add another item to the same list without conflicting. Some embodiments may further examine a past history of commands by the users to determine the context. Continuing with the grocery list example, if the second command was given by a child to add candy to the grocery list, the first user may override that command and/or otherwise mark it as conflicting. After one or more such events, some embodiments may learn to treat that second command as conflicting, even if the same two commands are non-conflicting with respect to other users. Similarly, past history may be used to help determine whether or not duplicate entries are conflicting.

Some embodiments may utilize the past history of commands to define a fuzzy contextual boundary around future commands. For example, in an industrial setting, a lead engineer initialize a process with a set of instructions. The first time an employee gives a command that conflicts with those initial instructions, the IoT system may ask a supervisor to approve the conflicting command. If the supervisor frequently and routinely approves that specific conflicting command, then the IoT system may eventually begin treating that command as potentially non-conflicting (e.g., notify the supervisor, but not require approval before executing the command), and then eventually non-conflicting (e.g., execute the command normally). In this way, some embodiments may establish dynamic guardrails around the initial instructions from the lead engineer. These embodiments may also be desirable to proactively identify mistaken and/or rogue instructions because the initial instructions can be made relatively strict and then dynamically modified/eased as the organization develops expertise in the process. That is, the normal practice of the organization may be dynamically integrated into the authorization levels for its members/employees.

Some embodiments may tag different voices with one or more attributes to help establish context. Some embodiments may establish these attributes by:
 (i) when the identities of the speakers' voices are unknown to the system, the IoT system may utilize physical information (e.g., where the command is being given in context to the IoT device) and/or may utilize prior history with the IoT system (e.g., prior commands from this voice, prior interactions between the voices, etc.) that provide hierarchical context (e.g., one party calling the other party "boss") to map the voice(s) to hierarchical persona (child, parent, employee, manager, etc.);

(ii) when identities of the voices are known to the system e.g., from an external authentication mechanism: attributes may be retrieved from one or more external datastore(s), such as enterprise hierarchy data stores in the business world.

These attributes may be leveraged to build a systematic physical-world hierarchy for a given physical-world context, such as home, school, office, etc. With the hierarchy of the users established, the relative positions in the hierarchy may be used to provide conflict resolution for the conflicting commands, e.g., honoring the commands of the speaker further up in the hierarchy.

One or more machine learning models may be used to dynamically generate the hierarchy between the users in some embodiments. For example, in a home environment, an IoT device adapted for voice commands may analyze users' voices and determine that a user with a perceived adult voice will be given a position higher to that of a user with a perceived child voice when in the home environment. Thus, commands issued by users perceived to be adults may be prioritized over commands issued by users perceived to be children.

Additionally, the machine learning models may utilize one or more external data sources, such as corporate directories, to dynamically generate a hierarchy customized for a specific project, a specific machine, etc. This may include querying a corporate directory to determine an explicit hierarchy, extracting one or more relevant job roles, and/or to inferring relevant job experience. Derivation of the dynamic hierarchy, in turn, may include mapping the hierarchy, previous job roles, and previous job experience to a specific context of the commands. In this way, a dynamic, customized hierarchy may be generated for each particular task and employee pair. For example, for a programming task, the machine learning model may rank employees with previous programming experience higher than a person whose previous experience is mostly in sales, even though the salesperson may have a higher title within the corporate directory. Similarly, if a developer and a technical lead are working collaboratively on a project (e.g., pair programming) using a voice enabled integrated development environment (IDE), the two employees may debug code using a series of voice commands and there may be conflicting execution scenarios. The voice command component of the IDE may recognize the voices for both employees (e.g., because they authenticated into the corporate network). The voice command component may then leverage an enterprise directory to recognize that the technical lead is the more senior of the two and/or more skilled in this specific area, and therefore, prioritize the lead's commands over the developer's commands.

In another illustrative example, a parent may ask a voice-command-enabled IoT device to play educational content and, once the content is started, a child gives another command to play jingles. In this application, the IoT device may detect and understand the parent-child hierarchy at home, and thus, may know that when both parent and child have given voice inputs that conflict, the system should continue to comply with parent's inputs. The system in some embodiments may thus continue to play the educational content. If, however, the child gives a non-conflicting voice input e.g., to increase/decrease the volume then, the system in some embodiments may comply with that command.

In another illustrative example involving a parent and child, the parent asked a voice command enabled IoT device to add items to the shopping list for which an order will be placed automatically. Later in the day, the child asks the IoT device to add candy and chocolates to the shopping list. In this illustrative example, a similar situation has occurred in the past that resulted in additional items being ordered, and the parent has subsequently instructed and/or trained the IoT device not to accept shopping list management commands from anyone except her. The IoT device in this example may learn that these commands are conflicting, and in the future, will not add the candy or chocolates to shopping list.

Another illustrative example involves a voice enabled IoT thermostat that controls the temperature of a home, a homeowner whose voice the IoT thermostat recognizes from past interactions, and a guest whose voice the thermostat does not recognize. In this example, the host feels cold and issues a voice command to raise the temperature. The IoT thermostat honors this request. The guest disagrees and would like to lower the temperature, and thus, attempts to issue a voice command to lower the temperature. The IoT thermostat may not honor this request and may provide feedback to the guest that the host has recently set this temperature and the guest cannot override that setting.

Those skilled in the art will appreciate that embodiments of the disclosure are not limited to IoT devices. For example, a voice enabled autonomous vehicle may be occupied by two people: one person seated in the owner/driver seat and the other person seated in the passenger seat. In this example, the autonomous vehicle may detect from where each voice is originating, and may be configured to treat a person in the driver seat as having a higher position in the hierarchy than the person in the passenger seat. In this example, the passenger instructs the autonomous vehicle to drive to a nearby market. If no commands have been given by the driver regarding the destination, the autonomous vehicle may accept this command and begin the trip. Along the way, the driver may give a command to go to a restaurant. The autonomous vehicle may also accept this command, and thus, change the destination. If passenger subsequently objects and instructs the autonomous vehicle to continue on to the market, the autonomous vehicle may explain this last command will not be honored because the driver has set a destination and that destination has not been reached.

Another illustrative example involves a co-robotics manufacturing line. In this example, several collaborative robot (cobots) are overseen by a pair of workers and a supervisor. Voices from all of the employees are already known and have been previously registered in a voice command module of a cobot control program. In this example, one of the workers detects a defect and gives a verbal command to stop the manufacturing line. This command may be initially accepted by the voice command module, and the manufacturing line may be stopped. The supervisor, upon hearing the command, may determine that that the product should be tagged for rework at the end of the manufacturing process. The supervisor may instruct the voice command module to continue despite the defect. While this command conflicts with the prior stop command, the supervisor has a higher priority. Therefore, the voice command module may accept the supervisor's command.

In some embodiments, conflict resolution may be initiated when a conflict is sensed for a command from someone lower in the real world hierarchy that requires someone higher in the hierarchy to resolve. Continuing the co-robotics manufacturing line example above, consider a scenario where one of a workers detects a defect and provides the instruction for manufacturing line to continue. The command processing system could evaluate the command and, by leveraging historical information, determine that there is a potential for serious injuries with the identified defect. The conflict processing system may respond by automatically requesting the supervisor review and provide feedback before work can continue.

In some embodiments, the hierarchy may be contextual, to be established dynamically based on the context. As an illustrative example, an autonomous vehicle may be remotely instructed by a parent to pick a child at school and to bring the child home. While in the vehicle, the child may ask to stop at a snack outlet. Because this command is in conflict with the command that the parent issued, the autonomous vehicle in some embodiments may not fulfill the child's command and may continue back home. Later, if the parent issues a second remote command to the autonomous vehicle asking for a detour to pick himself up on the way home, the autonomous vehicle may determine that, even though this third command conflicts from the original command, it should take the detour and pick up the parent on the way.

Another illustrative example involves communication between IoT devices, where the conflict resolution happens at an intelligent orchestration layer. In this illustrative example, a human user has multiple IoT devices (e.g., a smart refrigerator, a smart washing machine, etc.) that can add items a grocery list. In this example, the smart refrigerator may determine the family is out of ice cream and issue a command to add it to the grocery list. The family, however, may have a new fitness goal in which they agreed to abstain from such high calorie foods. The intelligent orchestration layer may determine that the command to add ice cream conflicts with the fitness goal, and then either reject the command to add ice cream or flag the command for subsequent review.

Data Processing System

FIG. 1 illustrates one embodiment of a data processing system (DPS) 100a, 100b (herein generically referred to as a DPS 100), consistent with some embodiments. FIG. 1 only depicts the representative major components of the DPS 100, and those individual components may have greater complexity than represented in FIG. 1. In some embodiments, the DPS 100 may be implemented as a personal computer; server computer; portable computer, such as a laptop or notebook computer, PDA (Personal Digital Assistant), tablet computer, or smartphone; processors embedded into larger devices, such as an automobile, airplane, teleconferencing system, appliance; smart devices; or any other appropriate type of electronic device. Moreover, components other than or in addition to those shown in FIG. 1 may be present, and that the number, type, and configuration of such components may vary.

The data processing system 100 in FIG. 1 may comprise a plurality of processing units 110a-110d (generically, processor 110 or CPU 110) that may be connected to a main memory 112, a mass storage interface 114, a terminal/display interface 116, a network interface 118, and an input/output ("I/O") interface 120 by a system bus 122. The mass storage interfaces 114 in this embodiment may connect the system bus 122 to one or more mass storage devices, such as a direct access storage device 140, a USB drive 141, and/or a readable/writable optical disk drive 142. The one or more direct access storage devices 140 may be logically organized into a RAID array, which in turn, may be managed by a RAID controller 115 in e.g., the mass storage interface 114, by software executing on the processor 110, or a combination of both. The network interfaces 118 may allow the DPS 100a to communicate with other DPS 100b over a network 106. The main memory 112 may contain an operating system 124, a plurality of application programs 126, and program data 128.

The DPS 100 embodiment in FIG. 1 may be a general-purpose computing device. In these embodiments, the processors 110 may be any device capable of executing program instructions stored in the main memory 112, and may themselves be constructed from one or more microprocessors and/or integrated circuits. In some embodiments, the DPS 100 may contain multiple processors and/or processing cores, as is typical of larger, more capable computer systems; however, in other embodiments, the computing systems 100 may only comprise a single processor system and/or a single processor designed to emulate a multiprocessor system. Further, the processor(s) 110 may be implemented using a number of heterogeneous data processing systems 100 in which a main processor 110 is present with secondary processors on a single chip. As another illustrative example, the processor(s) 110 may be a symmetric multiprocessor system containing multiple processors 110 of the same type.

When the DPS 100 starts up, the associated processor(s) 110 may initially execute program instructions that make up the operating system 124. The operating system 124, in turn, may manage the physical and logical resources of the DPS 100. These resources may include the main memory 112, the mass storage interface 114, the terminal/display interface 116, the network interface 118, and the system bus 122. As with the processor(s) 110, some DPS 100 embodiments may utilize multiple system interfaces 114, 116, 118, 120, and buses 122, which in turn, may each include their own separate, fully programmed microprocessors.

Instructions for the operating system 124 and/or application programs 126 (generically, "program code," "computer usable program code," or "computer readable program code") may be initially located in the mass storage devices, which are in communication with the processor(s) 110 through the system bus 122. The program code in the different embodiments may be embodied on different physical or tangible computer-readable media, such as the memory 112 or the mass storage devices. In the illustrative example in FIG. 1, the instructions may be stored in a functional form of persistent storage on the direct access storage device 140. These instructions may then be loaded into the main memory 112 for execution by the processor(s) 110. However, the program code may also be located in a functional form on the computer-readable media, such as the direct access storage device 140 or the readable/writable optical disk drive 142, that is selectively removable in some embodiments. It may be loaded onto or transferred to the DPS 100 for execution by the processor(s) 110.

With continuing reference to FIG. 1, the system bus 122 may be any device that facilitates communication between and among the processor(s) 110; the main memory 112; and the interface(s) 114, 116, 118, 120. Moreover, although the system bus 122 in this embodiment is a relatively simple, single bus structure that provides a direct communication path among the system bus 122, other bus structures are consistent with the present disclosure, including without limitation, point-to-point links in hierarchical, star or web configurations, multiple hierarchical buses, parallel and redundant paths, etc.

The main memory 112 and the mass storage device(s) 140 may work cooperatively to store the operating system 124, the application programs 126, and the program data 128. In some embodiments, the main memory 112 may be a random-access semiconductor memory device ("RAM") capable of storing data and program instructions. Although FIG. 1 conceptually depicts that the main memory 112 as a single monolithic entity, the main memory 112 in some embodiments may be a more complex arrangement, such as a hierarchy of caches and other memory devices. For example, the main memory 112 may exist in multiple levels of caches, and these caches may be further divided by function, such that one cache holds instructions while another cache holds non-instruction data that is used by the processor(s) 110. The main memory 112 may be further distributed and associated with a different processor(s) 110 or sets of the processor(s) 110, as is known in any of various so-called non-uniform memory access (NUMA) computer architectures. Moreover, some embodiments may utilize virtual addressing mechanisms that allow the DPS 100 to behave as if it has access to a large, single storage entity instead of access to multiple, smaller storage entities (such as the main memory 112 and the mass storage device 140).

Although the operating system 124, the application programs 126, and the program data 128 are illustrated in FIG. 1 as being contained within the main memory 112 of DPS 100a, some or all of them may be physically located on a different computer system (e.g., DPS 100b) and may be accessed remotely, e.g., via the network 106, in some embodiments. Moreover, the operating system 124, the application programs 126, and the program data 128 are not necessarily all completely contained in the same physical DPS 100a at the same time, and may even reside in the physical or virtual memory of other DPS 100b.

The system interfaces 114, 116, 118, 120 in some embodiments may support communication with a variety of storage and I/O devices. The mass storage interface 114 may support the attachment of one or more mass storage devices 140, which may include rotating magnetic disk drive storage devices, solid-state storage devices (SSD) that uses integrated circuit assemblies as memory to store data persistently, typically using flash memory or a combination of the two. Additionally, the mass storage devices 140 may also comprise other devices and assemblies, including arrays of disk drives configured to appear as a single large storage device to a host (commonly called RAID arrays) and/or archival storage media, such as hard disk drives, tape (e.g., mini-DV), writable compact disks (e.g., CD-R and CD-RW), digital versatile disks (e.g., DVD, DVD-R, DVD+R, DVD+RW, DVD-RAM), holography storage systems, blue laser disks, IBM Millipede devices, and the like. The I/O interface 120 may support attachment of one or more I/O devices, such as a keyboard 181, mouse 182, modem 183, or printer (not shown)

The terminal/display interface 116 may be used to directly connect one or more displays 180 to the data processing system 100. These displays 180 may be non-intelligent (i.e., dumb) terminals, such as an LED monitor, or may themselves be fully programmable workstations that allow IT administrators and users to communicate with the DPS 100. Note, however, that while the display interface 116 may be provided to support communication with one or more displays 180, the computer systems 100 does not necessarily require a display 180 because all needed interaction with users and other processes may occur via the network 106.

The network 106 may be any suitable network or combination of networks and may support any appropriate protocol suitable for communication of data and/or code to/from multiple DPS 100. Accordingly, the network interfaces 118 may be any device that facilitates such communication, regardless of whether the network connection is made using present-day analog and/or digital techniques or via some networking mechanism of the future. Suitable networks 106 include, but are not limited to, networks implemented using one or more of the "InfiniBand" or IEEE (Institute of Electrical and Electronics Engineers) 802.3x "Ethernet" specifications; cellular transmission networks; wireless networks implemented one of the IEEE 802.11x, IEEE 802.16, General Packet Radio Service ("GPRS"), FRS (Family Radio Service), or Bluetooth specifications; Ultra-Wide Band ("UWB") technology, such as that described in FCC 02-48; or the like. Those skilled in the art will appreciate that many different network and transport protocols may be used to implement the network 106. The Transmission Control Protocol/Internet Protocol ("TCP/IP") suite contains a suitable network and transport protocols.

Cloud Computing

Figure 2:
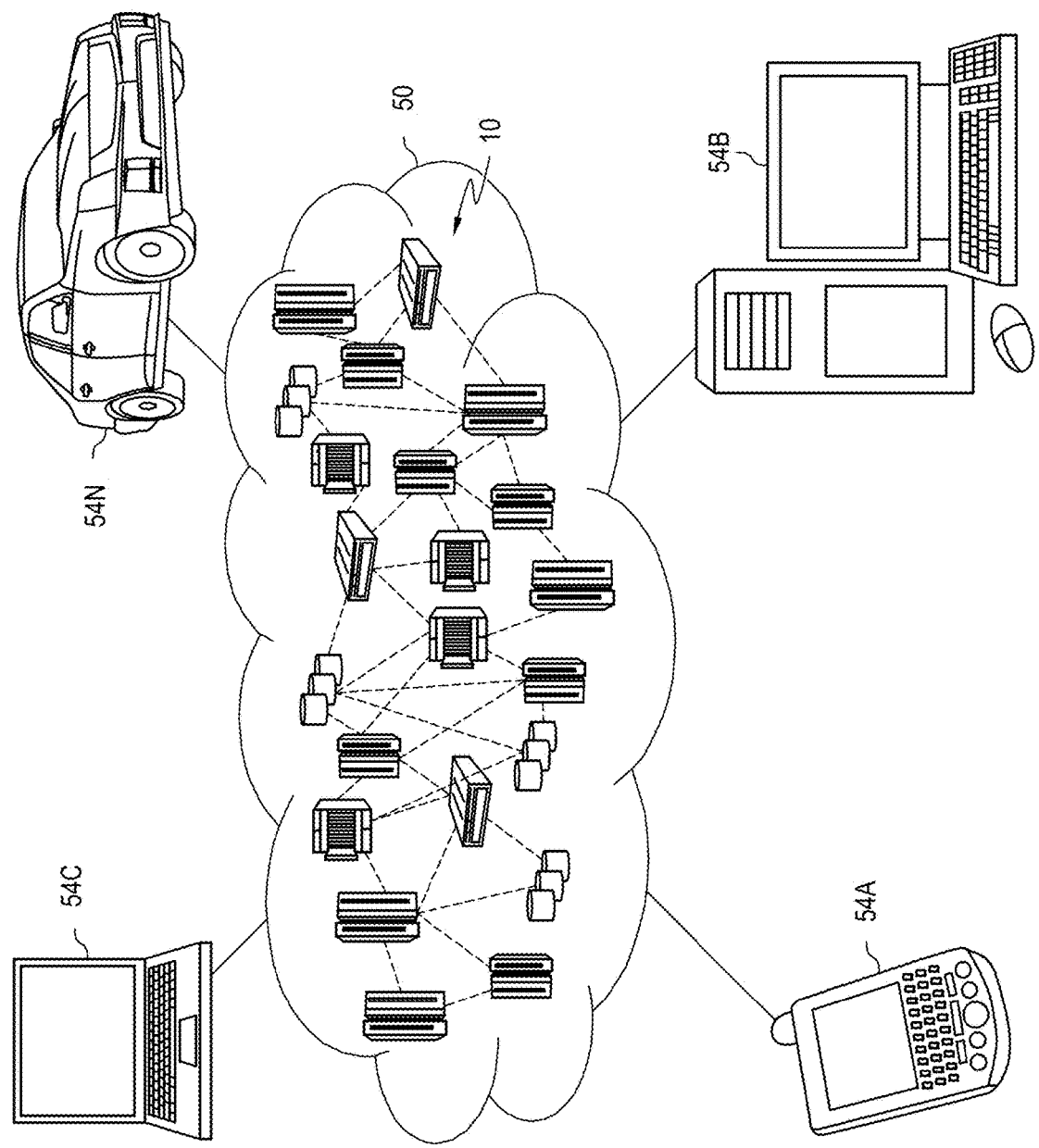
FIG. 2 depicts a cloud computing environment according to an embodiment of the present disclosure.

FIG. 2 illustrates one embodiment of a cloud environment suitable for providing a NLP service, including a machine learning model. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
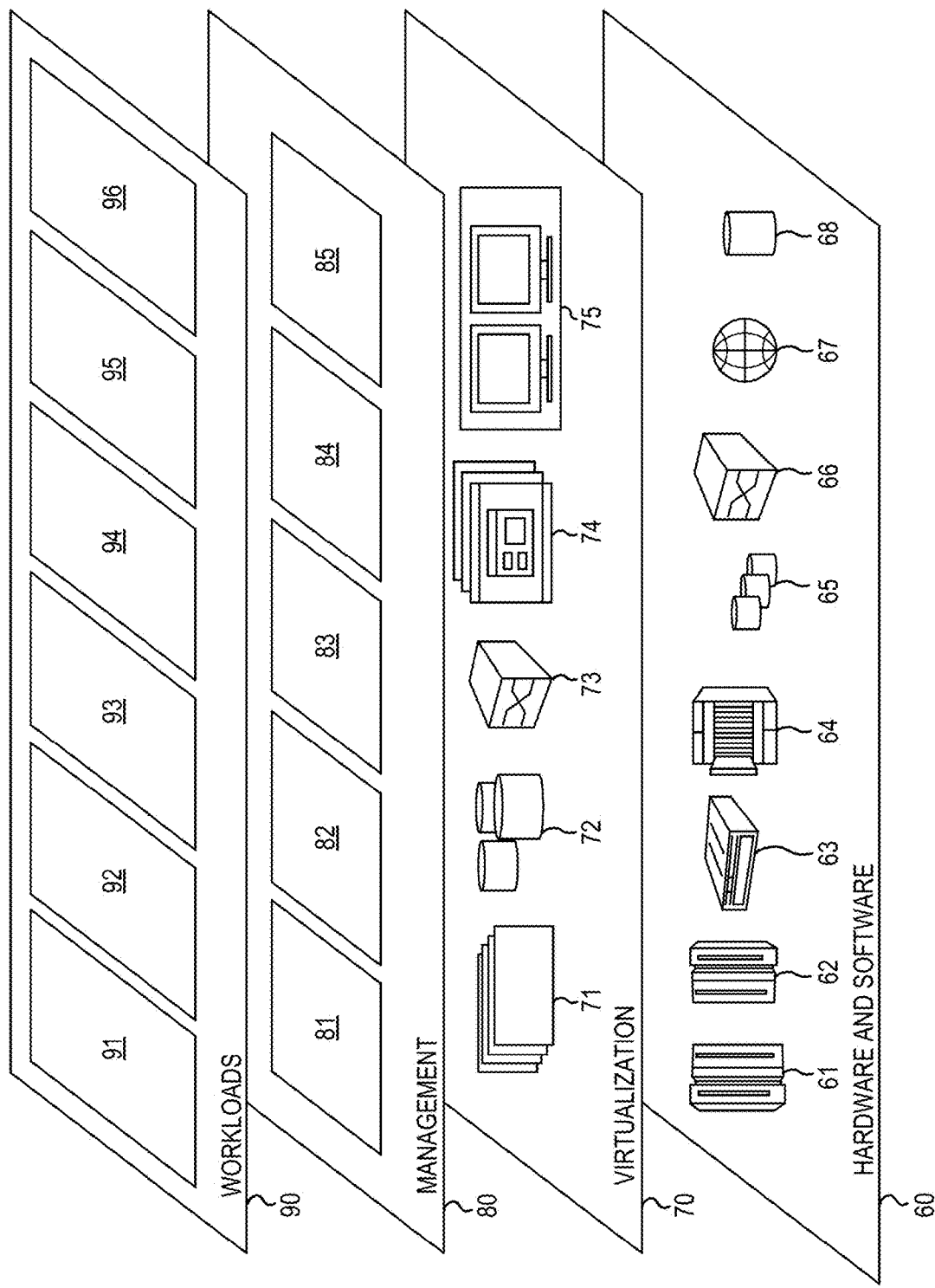
FIG. 3 depicts abstraction model layers according to an embodiment of the present disclosure.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and NLP service 96.

Voice Command IoT Devices

Figure 4:
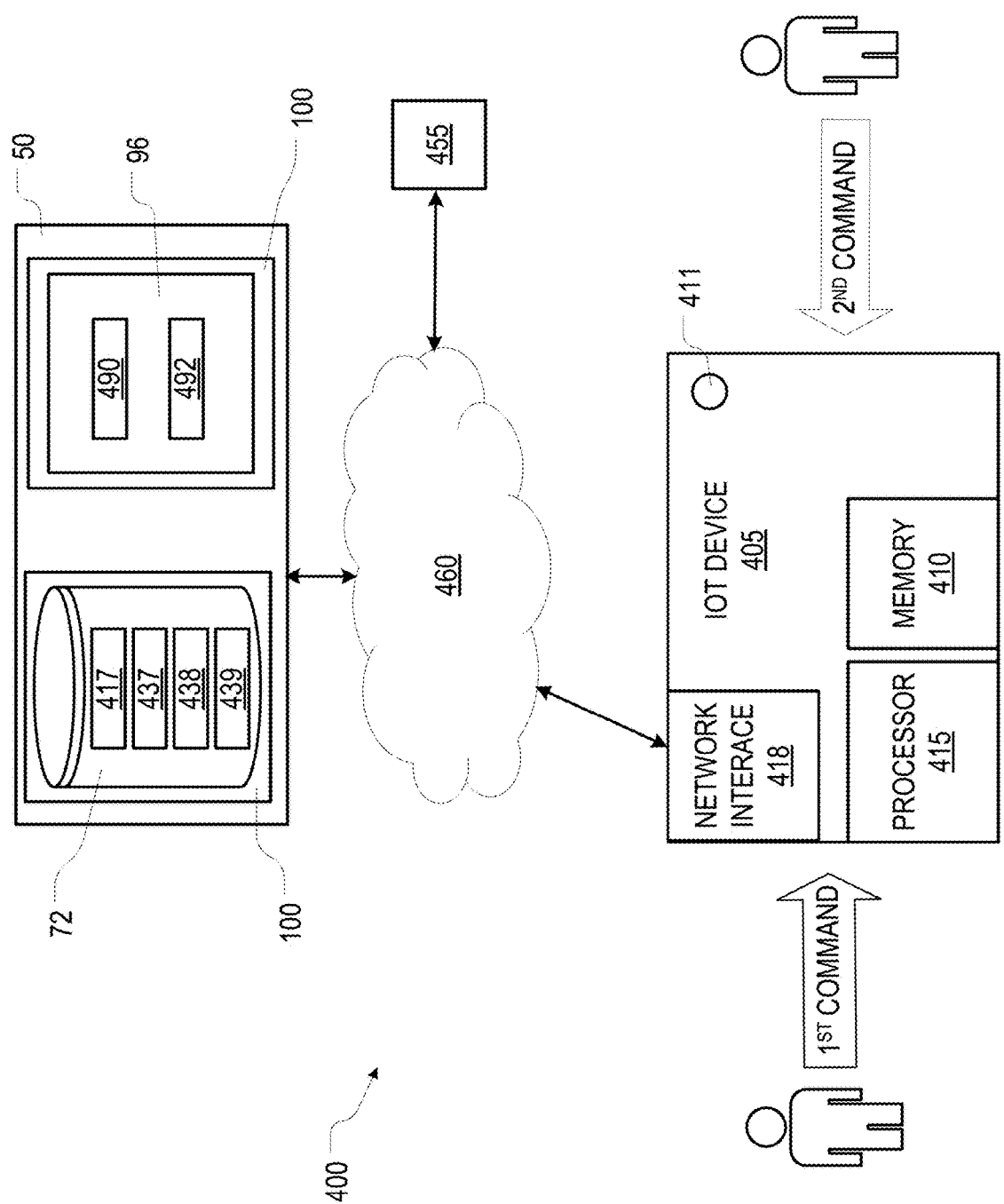
FIG. 4 illustrates an example embodiment of a voice command IoT system, consistent with some embodiments.

FIG. 4 illustrates an example embodiment of an IoT system 400 consistent with some embodiments. The IoT system 400 includes a voice command enabled IoT device 405 that has a memory 410, a processor 415, and a network interface 418. The memory 410 may store data, such as user settings, user usage history, user commands, and user profile data. The processor 415 may perform functions, such as receiving voice commands, submitting the voice commands to the NLP service 96 for analysis, and executing the resulting series of commands from the NLP service 96. In some embodiments, the processor 415 may execute computer-readable instructions to perform one or more of the methods described herein. Additionally, in some embodiments, the IoT device 405 may include one or more audio indicators or visual displays 411 that may provide information, such as an indication of how a command is being treated. For example, an audio indicator may beep twice when a command is ignored, an LED may emit a certain color light when a command is performed or queued, etc.

The IoT device 405 may communicate with an array of devices, such as an NLP service 96 and one or more electronic device(s) 455 via one or more networks 460 and network interface 418. The electronic device(s) 455, in turn, may each contain an application programming interface (API) through which the IoT device 405 can control their operation. The network 460 may be implemented using any number of any suitable communications media. For example, the network 460 may be a wide area network (WAN), a local area network (LAN), an internet, or an intranet. In some embodiments, the NLP service 96, the electronic device(s) 455, and/or the IoT device 405 may be communicatively coupled using a combination of one or more networks and/or one or more local connections. For example, the electronic device(s) 455 may be hardwired to the IoT device 405 (e.g., connected with an Ethernet cable) while NLP service 96 may communicate with the IoT device 405 using the network 460 (e.g., over the Internet).

In some embodiments, portions of the network 460 can be implemented within a cloud computing environment 50 or using one or more cloud computing services. Consistent with various embodiments, a cloud computing environment 50 may include a network-based, distributed data processing system (DPS) 100 that provides one or more cloud computing services, including the NLP service 96. Further, a cloud computing environment 50 may include many DPS(s) 100 (e.g., hundreds or thousands of computers or more) disposed within one or more data centers and configured to share resources over the network 460.

In some embodiments, the NLP service 96 may include one or more command analysis models 490 and a conflict model 492. The NLP service 96 may also be adapted to query one or more data sources, such as a Voice-to-Identity (V2ID) mapping data store 417, an enterprise directory 437, a device/application specific enterprise data stores 438, and a historical knowledge data corpus 439. These data sources may be provided, in whole or in in part, by virtual storage 72.

Figure 5A:
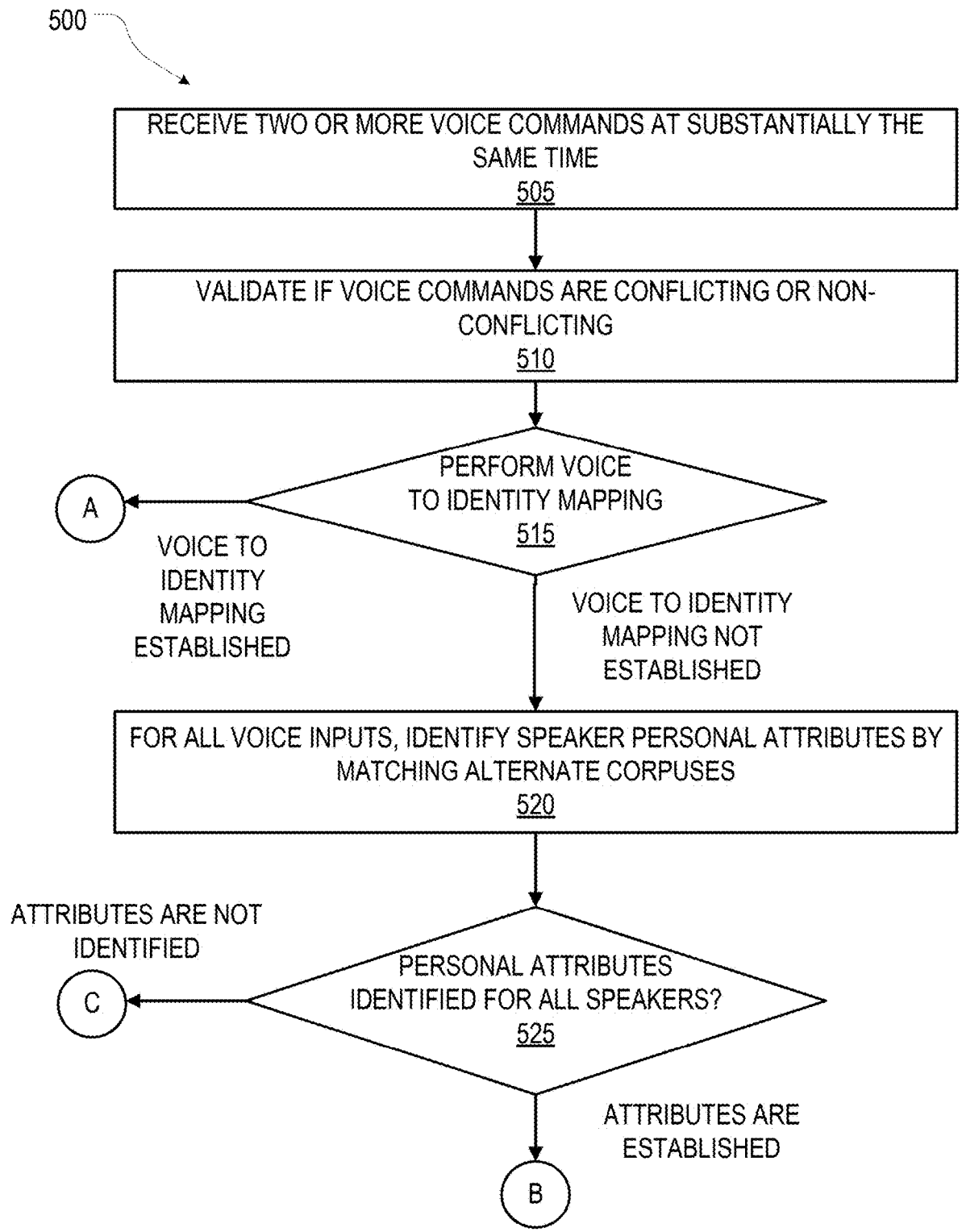
FIGS. 5A-5C are a flow chart illustrating one method of operating a voice command IoT system, consistent with some embodiments.
Figure 5B:
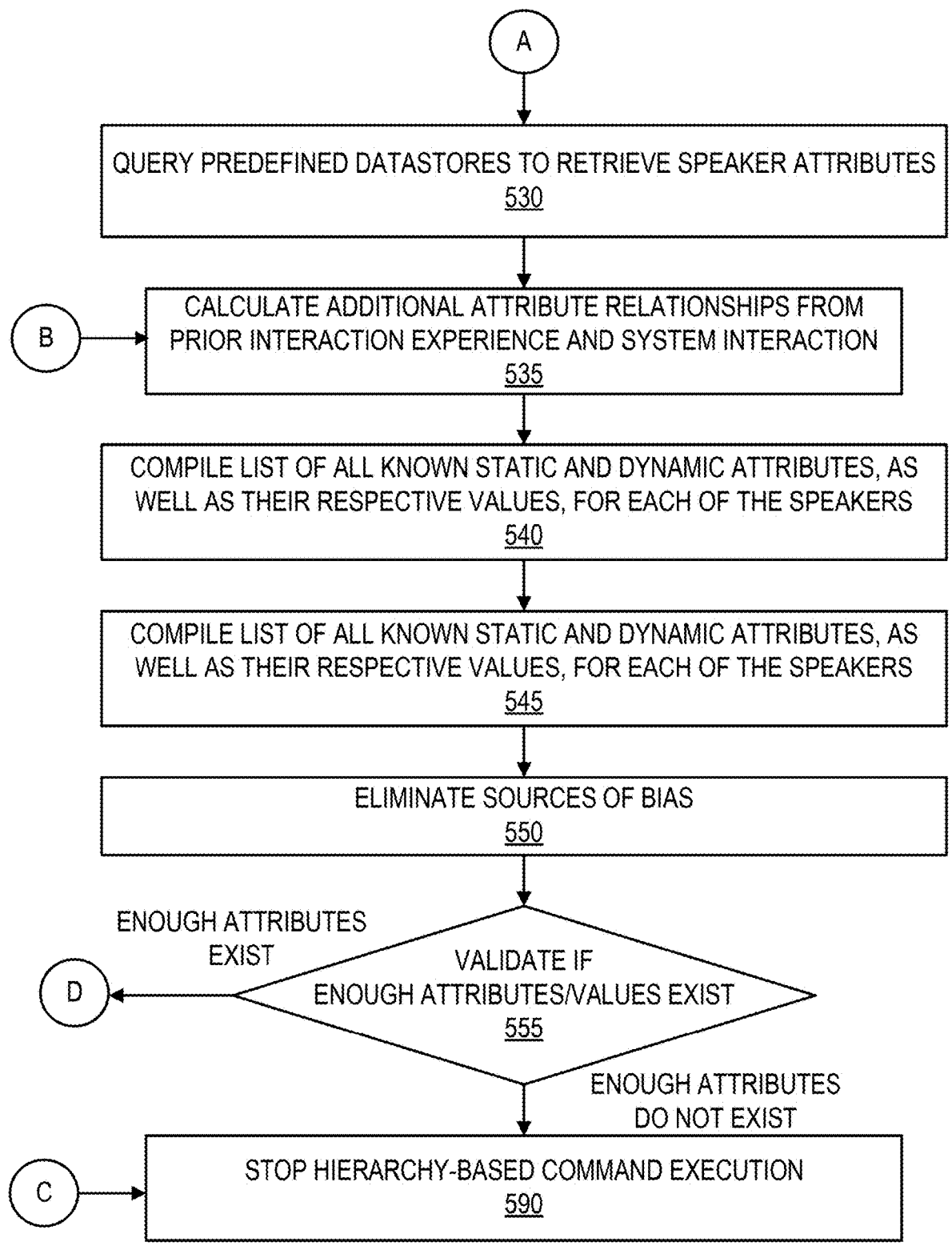
Figure 5C:
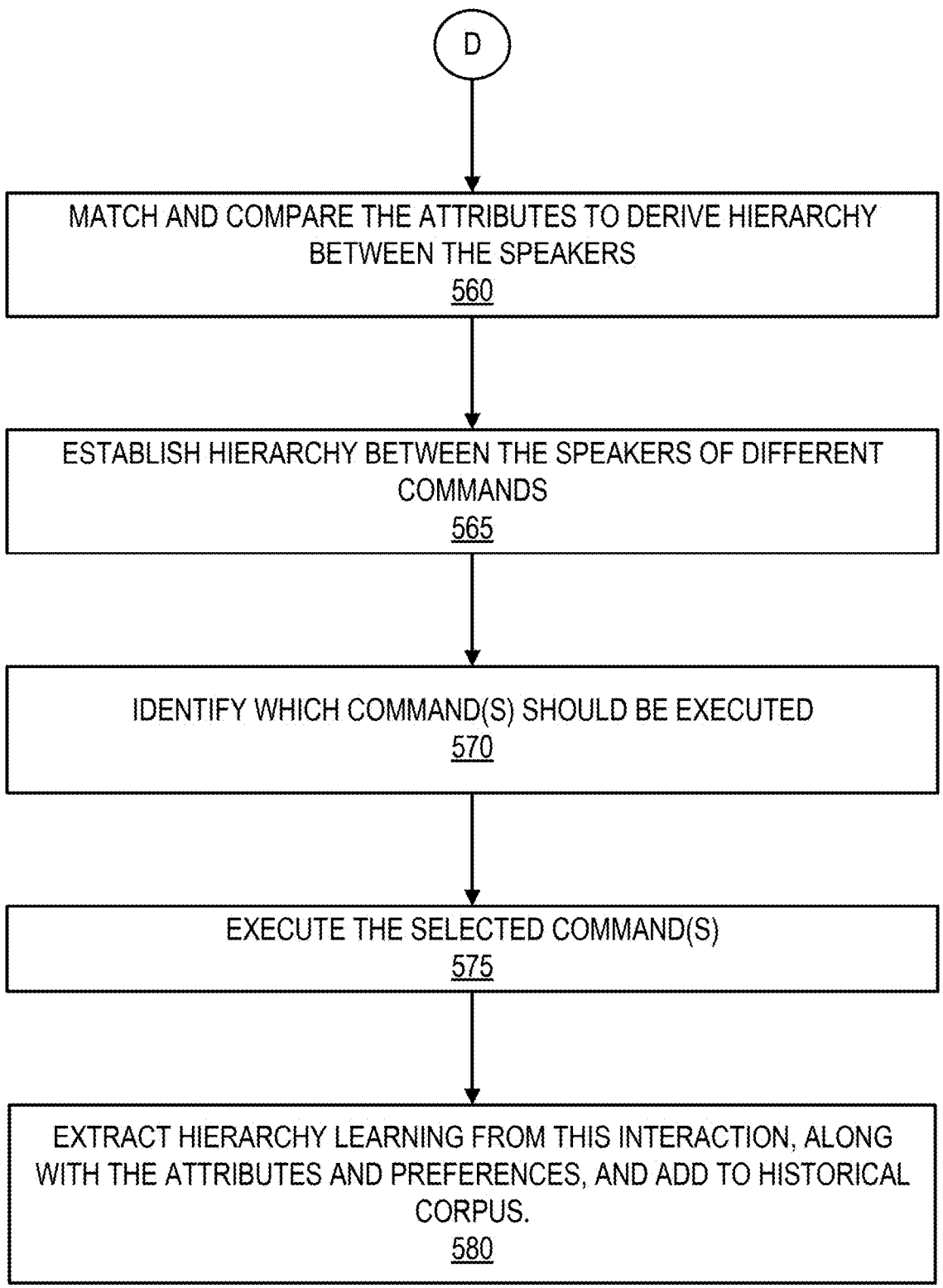

FIGS. 5A-5C are a flow chart illustrating one method 500 of operating the IoT device 405, consistent with some embodiment. At operation 505, the IoT device 405 may receive two or more voice commands at substantially the same time, where the amount of time considered to be "substantially the same" may be a configurable fixed amount of time or may depend on the nature of the specific voice commands (e.g., to any arbitrary length). Examples of the latter may include two or more voice commands, where the second voice command is received before the first voice command has been processed or where the outcome of the first voice command is still being presented, e.g., on an attached display device, or when the first command includes instructions to maintain that command/state until expressly revoked.

After the IoT device 405 receives and identifies that two or more voice commands were received at substantially the same time (as defined above), the IoT device 405 may validate if these voice commands are conflicting or non-conflicting at operation 510. An example of a conflicting voice command may be when an adult asks the IoT device 405 to play educational content and a child subsequently requests the IoT device 405 play jingles, or where a parent decreases volume and a child subsequently asks to increase it. An example of non-conflicting voice commands, in contrast, may be when the when an adult asks the IoT device 405 to play educational content and then the child subsequently requests to increase or decrease the volume. As will be discussed in more detail with reference to FIGS. 5-8, this operation may include the NLP service 96 translating the voice commands into strings of machine commands.

If the voice commands are not conflicting, the IoT device 405 may process them in the order received (not shown). If the IoT device 405 identifies that multiple voice commands are received at substantially the same time and that there are conflicting voice commands, however, the IoT device 405 may then determine which voice command(s) to prioritize. In some embodiments, this may include the IoT device 405 mapping the received voice(s) with the ident(ities) of the individual(s) who provided the command(s) at operation 515. The IoT device 405 in some embodiments may leverage the V2ID 417 to perform this mapping. Additionally or alternatively, the IoT device 405 may use authentication attributes (e.g., a user ID) that individual(s) present before using the IoT device 405. For example, a voice-command-enabled video conferencing system may be tied to enterprise authentication system, which may require that all employees authenticate (e.g., login) before using that system. In some embodiments, the identities in the V2ID 417 may have limited attributes due to functional or privacy considerations. For example, an IoT device 405 adapted for use with a consumer-grade home automation system may only recognize individuals that have previously used that device 405, but not explicitly require that the users authenticate themselves.

At operation 525, the IoT device 405 may validate whether the persona attributes for all speakers are identified so that a hierarchy can be established. If all persona attributes are identified, then the system moves further to operation 535. However, if all of the relevant persona attributes are not identified, and hence the IoT device 405 cannot establish the hierarchy, then the IoT device 405 may stop performing the hierarchy-based command execution and may execute the commands in sequence at operation 590.

Depending on the mapping within the V2ID 417, IoT device 405 may or may not be able to map one or more voices with a corresponding speaker identity. If the IoT device 405 is unable to identify the individual via the V2ID 417, the IoT device 405 may use/leverage one or more alternate corpuses to map that voice to a persona at operation 520. The alternate corpuses in some embodiments may have multiple personas specifically tailored for grouping voices into hierarchical scenarios. Examples of such personas could be a child persona, an adult persona, a non-parental adult persona, a supervisor persona, etc. The IoT device 405 in these embodiments may also leverage one or more external data stores that matches a unique device identifier associated with the IoT device 405 to the persona to identify if the persona is a known persona or an unknown persona, such as a social media login.

If the IoT device 405 validates the persona attributes for all speakers, a hierarchy can be established at operation 525. If all persona attributes are identified, then the system moves further to operation 535, However, if all of the relevant persona attributes were not identified, and hence the system cannot establish the hierarchy, then the IoT device 405 may stop performing the hierarchy-based command execution and may proceed with executing the commands in sequence at operation 590.

If the IoT device 405 was able to establish voice to identity mapping at operation 515, the IoT device 405 may retrieve speaker attributes by looking up predefined datastores, such as an enterprise directory 437 or other device/application specific enterprise data stores 438, at operation 530. Example of such attributes may be enterprise hierarchical relationships, skills mapping, position within a team etc. that are relevant within the context of the command execution. For example, if a remote operation is being performed by a team of engineers through robotic equipment that works through voice commands, the IoT device 405 may use the enterprise directory 437 to identify the hierarchy of engineers based on their individual experience, number of remote operations performed, and/or other relevant attributes.

At operation 535, the IoT device 405 may calculate additional attribute relationships from prior interaction experience and system interaction (e.g., based on historical knowledge data corpus 439), which may be further supplemented by the attribute lists generated in operation 530. For example, the IoT device 405 in some embodiments may leverage historical data corpuses to identify that one of the speakers has a known association with the IoT device 405, but another speaker does not have a prior/historical association with the IoT device 405. The IoT device 405 may leverage this information accordingly via operations 540 and 545 (described below). In some embodiments, the IoT device 405 may skip this operation if no such additional attributes or hierarchical relationship mapping is identified from historical knowledge data corpus 439.

At operation 540, the IoT device 405 may compile a list of all known static and dynamic attributes, as well as their respective values, for each of the speakers that would help determine their hierarchy. As explained in more detail with reference to operation 530, the static attributes may be retrieved from one or more external sources, such as the enterprise directory 437 or the enterprise data store 438. The dynamic attributes, in turn, may be retrieved from one or more sources, such as the historical interaction experience corpus 439.

Next, the IoT device 405 may retrieve attribute weightage(s) and attribute override(s) from externalized configuration at operation 545. An example of weightage being applied may be that, when the IoT device 405 receives multiple voice commands from two adult personas, then the known voice may be provided a higher weightage compared to an unknown voice. Another example of weightage being applied may be that when IoT device 405 receives multiple known voice commands where in one persona is an adult and another persona is a child, then the IoT device 405 may provide higher weightage to the adult persona compared to the child persona. An example of override being applied may be that when the IoT device 405 receives multiple voices, where some are known and some are unknown, but when the IoT device 405 further drills down into the persona, it is identified that the known voice is associated to a child and unknown voice is associated to an adult. In such a scenario, the IoT device 405 may leverage additional override rules depending on specific user preferences, such as overriding an adult-provided command with the child-provided command.

The IoT device 405 may eliminate any attributes that could cause bias, such as gender/race, from the final list of attributes at operation 550. During this operation, any other attribute filtering could also be done (as applicable). Next, the IoT device 405 may validate if enough attributes, and their corresponding values, exist that will allow the IoT device 405 to derive a hierarchy at operation 555. If enough attributes do not exist, then the IoT device 405 may stop performing the hierarchy-based command execution and proceed with executing the command in sequence at operation 590. If enough attributes do exist, then the IoT device 405 may match and compare the attributes to derive a hierarchy between the speakers at operation 560. The hierarchy validation check may consider attribute weightage and any specific overrides that are established.

At operation 565, the IoT device 405 may establish a hierarchy between the speakers of different commands. Based on the established hierarchy, the IoT device 405 may identify which machine command(s) should be executed at operation 570.

Based on the hierarchy established, the IoT device 405 may execute the selected machine command(s) at operation 575. The execution of the command may result in different actions depending on the context of the input and its outcome that will allow the IoT device 405 to take a decision on the command's execution or its non-execution. Optionally the IoT device 405 may also provide feedback on why that command was executed (or not executed) and the hierarchy decision logic behind the same. For example, in a scenario where an adult has provided a command to an IoT device 405 to play educational stories and the child provides another command for playing rhymes, if the first command outcome (i.e., playing stories) does not finish, then the IoT device 405 may leverage the hierarchy logic and may not comply to the command that the child has provided, i.e., may not play the rhymes. In some applications, the IoT device 405 functionality may not depend on the completion of a command. For example, in a remotely executed operation in which different engineers are located in different locations and connected together via a remote conferencing where provided commands are being executed by robotics, when multiple commands are provided, then the IoT device 405 may perform the hierarchy-based execution to decide on which command will be executed.

Next, at operation 580, the IoT device 405 may extract hierarchy learning from this interaction along with the attributes and preferences (weightage/overrides) that were leveraged and add those to the historical corpus. The IoT device 405 may then stop the hierarchy-based command execution and perform command execution in sequence. The IoT device 405 may then stop, as no further actions are required.

Figure 6:
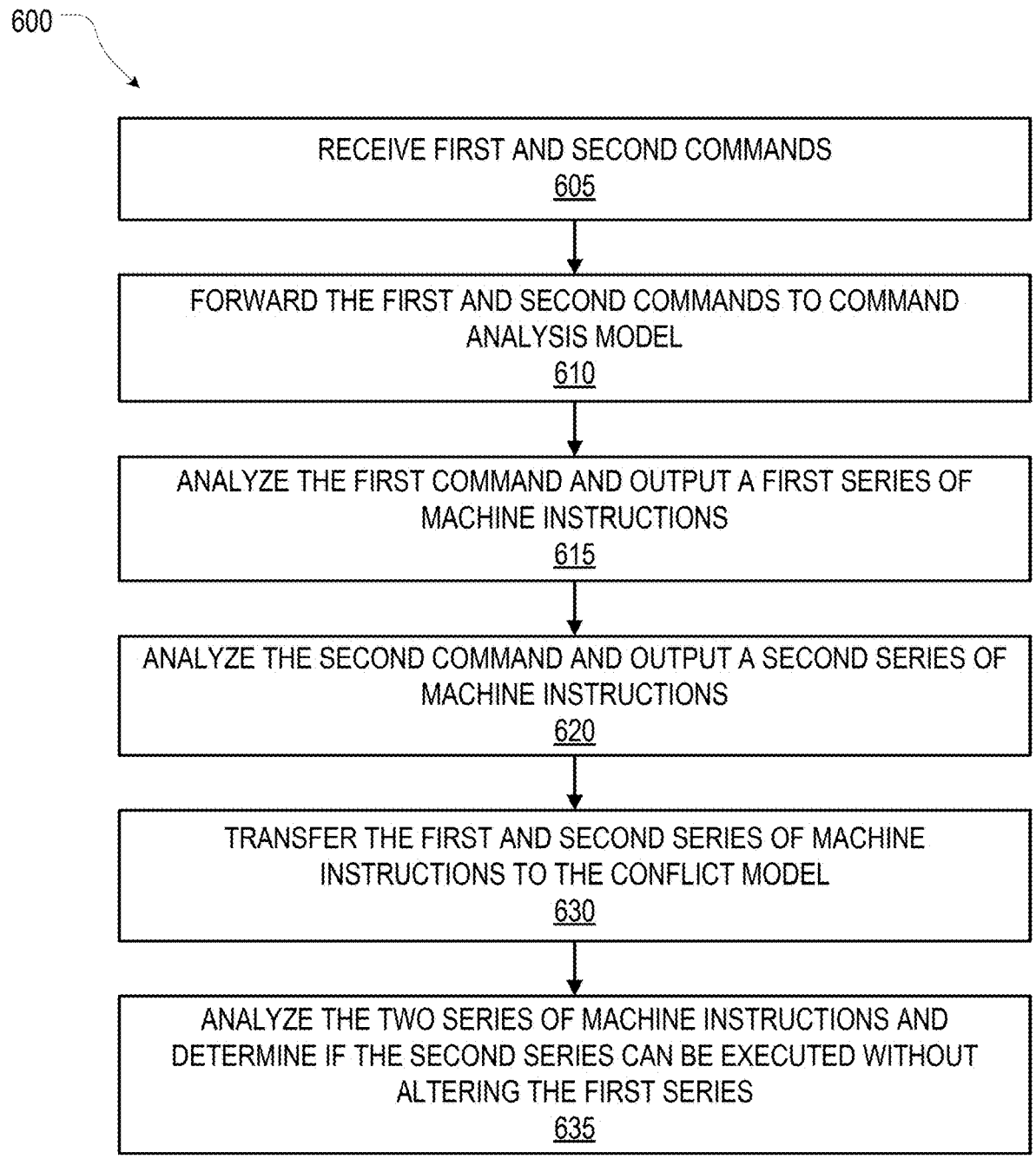
FIG. 6 is a flow chart showing one method for performing some operations by trained machine learning models, consistent with some embodiments.

FIG. 6 is a flow chart showing one method 600 for performing operation 510 by the machine learning models 490, 492, consistent with some embodiments. The method 600 begins by the IoT device 405 receiving the first and second commands. For example, the first command may be to play educational content and the second command may be to play jingles. This is illustrated at operation 605. The method 600 may continue with the IoT device 405 forwarding the first and second commands to the NLP service 96 in the cloud environment 50. This is illustrated by operation 610. The command analysis model 490 may then analyze the first command and output a first series of specific machine instructions at operation 615. For example, the command analysis model 490 may translate the first command into machine instruction to play content at a first uniform resource locator (URL) and a machine instruction to continue playing until that content ends. Next, the server DPS 100a may analyze the second voice command using the command analysis model 490 at operation 620 and output a second series of specific machine instructions. For example, the command analysis model 490 may translate the second command into a machine instruction to play the content at a first uniform resource locator (URL) and a machine instruction to continue playing until that content ends.

Next, the server DPS 100a may pass the first and second series of machine instructions to the trained conflict model 492 within the NLP service 96. This is illustrated at operation 630. The trained conflict model may analyze the two series of machine instructions and determine if the second series can be executed without altering the first series of machine instructions. This is illustrated at operation 635.

Model Training

The NLP service 96 may contain one or more machine learning models 490, 492 in some embodiments, which may be any software system that recognizes patterns. In some embodiments, the machine learning model machine learning models 490, 492 may comprise a plurality of artificial neurons interconnected through connection points called synapses. Each synapse may encode a strength of the connection between the output of one neuron and the input of another. The output of each neuron, in turn, may be determined by the aggregate input received from other neurons that are connected to it, and thus by the outputs of these "upstream" connected neurons and the strength of the connections as determined by the synaptic weights.

The machine learning models 490, 492 in some embodiments may be trained to solve a specific problem (e.g., to determine whether two series of commands can both be executed without conflict) by adjusting the weights of the synapses such that a particular class of inputs produce a desired output. This weight adjustment procedure in these embodiments is known as "learning." Ideally, these adjustments lead to a pattern of synaptic weights that, during the learning process, converge toward an optimal solution for the given problem based on some cost function.

In some embodiments, the artificial neurons may be organized into layers. The layer that receives external data is the input layer. The layer that produces the ultimate result is the output layer. Some embodiments include hidden layers between the input and output layers, and commonly hundreds of such hidden layers.

Figure 7:
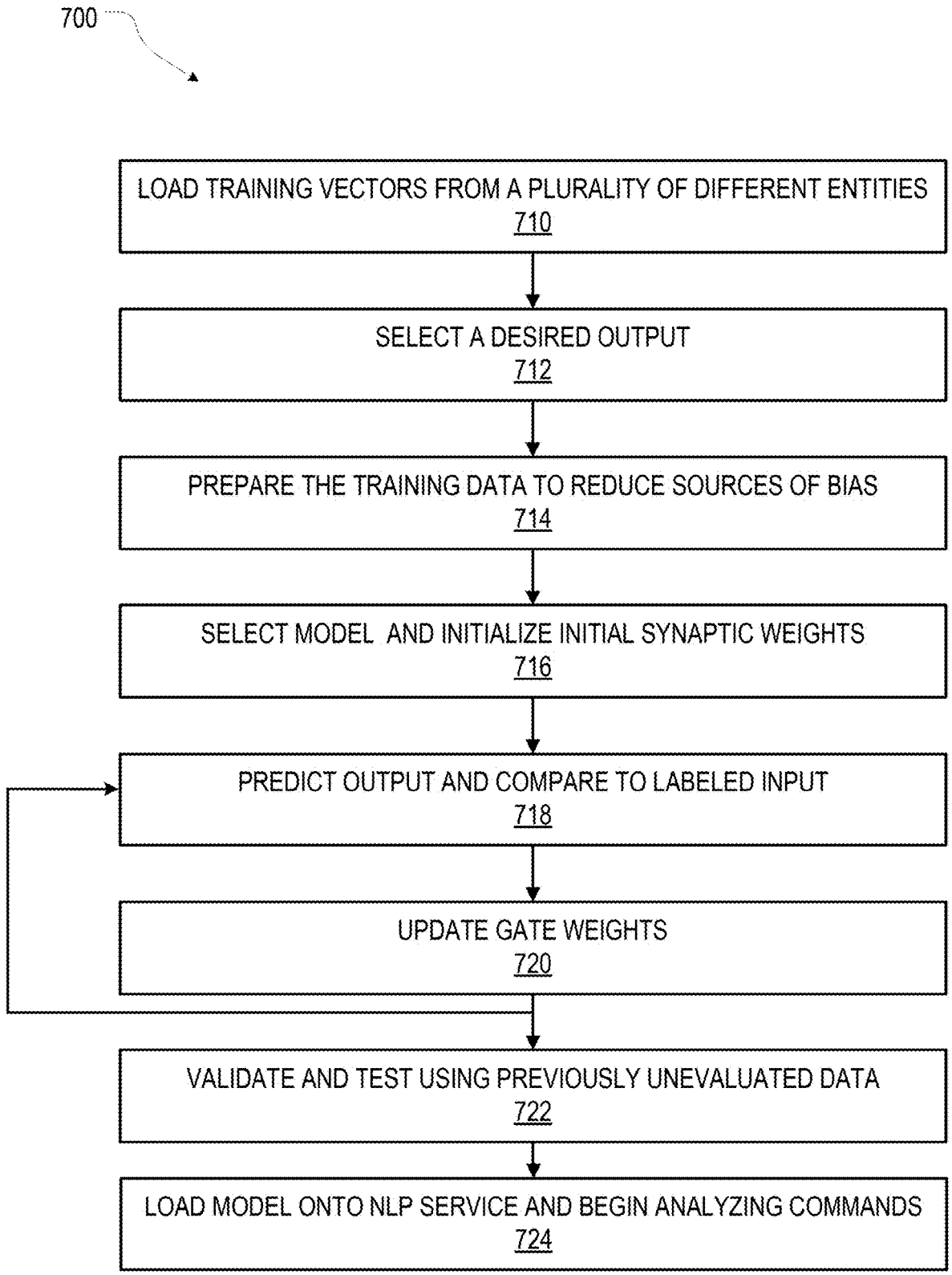
FIG. 7 is a flow chart illustrating one method of training a machine learning model, consistent with some embodiments.

FIG. 7 is a flow chart illustrating one method 700 of training the machine learning models 490, 492, consistent with some embodiments. A system manager may begin by loading training vectors at operation 710. These vectors may include audio recording from a plurality of different users reading specially prepared transcripts. Some of the transcripts contain conflicting series of commands. Other transcripts contain non-conflicting series of commands.

At operation 712, the system manager may select a desired output (e.g., do the series of commands conflict). At operation 714, the training data may be prepared to reduce sources of bias, typically including de-duplication, normalization, and order randomization. At operation 716, the initial weights of the gates for the machine learning model may be randomized. At operation 718, the machine learning models 490, 492 may be used to predict an output using set of input data vectors, and that prediction is compared to the labeled data. The error (e.g., the difference between the predicted value and the labeled data) is then used at operation 720 to update the gate weights. This process may repeat, with each iteration updating the weights, until the training data is exhausted, or the machine learning models 490, 492 reaches an acceptable level of accuracy and/or precision. At operation 722, the resulting models may optionally be compared to previously unevaluated data to validate and test its performance. At operation 724, the resulting model may be loaded onto the NLP service 96 used to analyze user commands.

Figure 8:
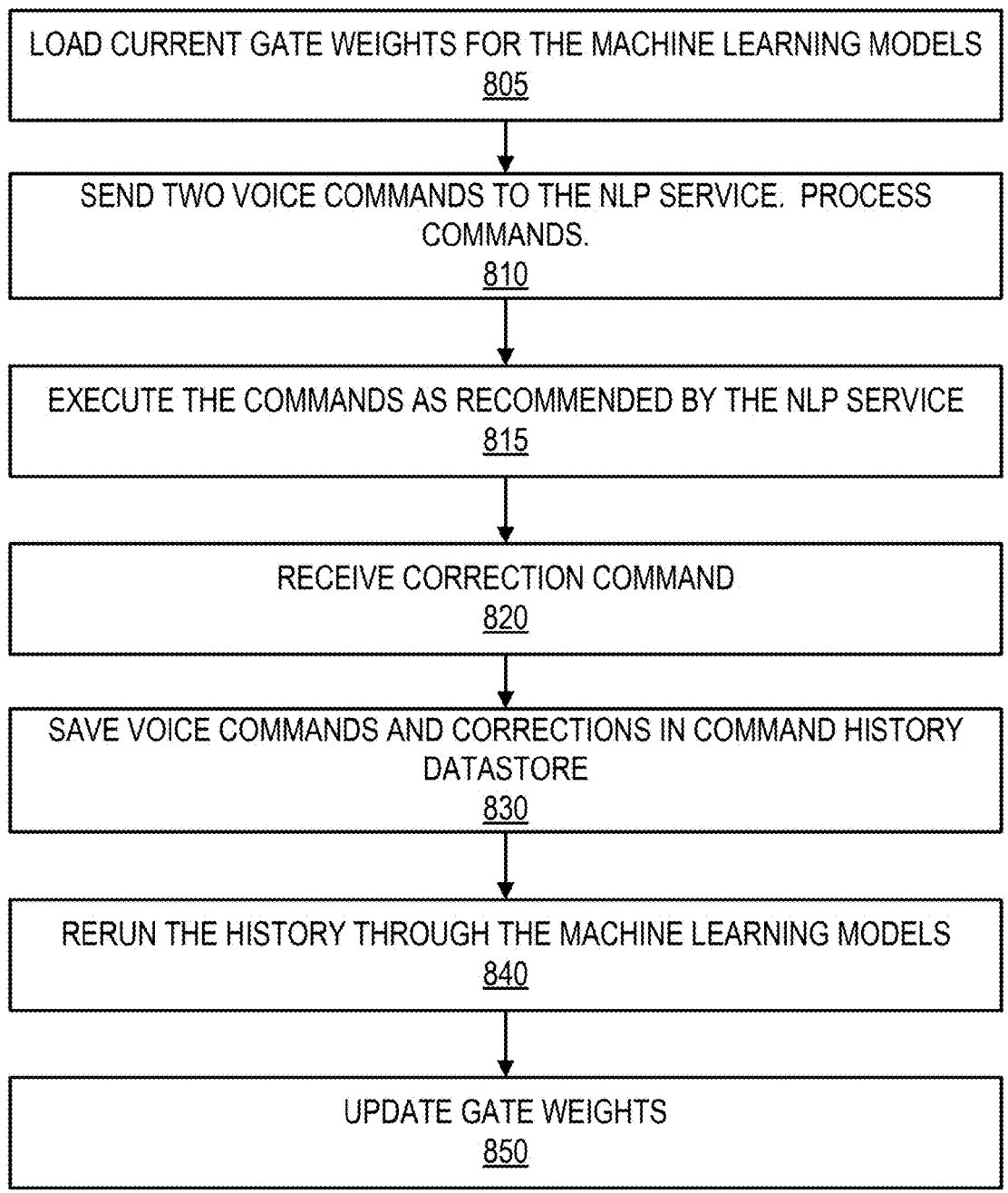
FIG. 8 is a flow chart illustrating one method of updating a machine learning model, consistent with some embodiments.

FIG. 8 is a flow chart illustrating one method 800 of updating the machine learning models 490, 492, consistent with some embodiments. At operation 805, the current gate weights for the machine learning models 490, 492 may be loaded. At operation 810, the IoT device 405 may send two voice commands to the NLP service 96, which may process the two voices using the method 500 described with reference to FIGS. 5A-5C and the current gate weights. The IoT device 405, in turn, may execute the commands as recommended by the NLP service 96 at operation 815. At operation 820, the higher ranking user may issue a correction command to the IoT device 405 in response to the executed commands.

The voice commands and the corrections may be saved in a command history datastore at operation 830. Periodically (e.g., daily), the NLP service 96 may rerun the history through the machine learning models 490, 492 and the correction command may be used to generate the error signal at operation 840. This error signal, in turn, may be used to update the gate weights at operation 850. The resulting model may then be loaded onto the NLP service 96 and used to analyze future user commands.

General

While embodiments of the disclosure have been described with reference to a voice command enabled IoT device, other systems and applications are within its scope and spirit. For example, some embodiments may be adapted for use in a gesture-controlled device, which may receive commands via user gestures (e.g., a physical movement that can be interpreted by a motion sensor) in addition to or instead of voice commands. Similarly, some embodiments may be adapted to receive one or both commands via conventional I/O systems, such as keyboards, mice, and/or touch screens. Conflict resolution may also initiated by device-initiated commands (e.g., in response to IOT-to-IOT communication). In these embodiments, the conflict resolution may happen at an intelligent orchestration layer.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

Therefore, it is desired that the embodiments described herein be considered in all respects as illustrative, not restrictive, and that reference be made to the appended claims for determining the scope of the invention.

What is claimed is:

1. A method for controlling a device comprising:
   receiving a first command from a first user at a device;
   receiving a second command from a second user at the device;
   determining, by a first trained machine learning model, that the second command conflicts with the first command;
   in response to determining the second command conflicts with the first command:
   identifying a context for one of the first commands and one of the second commands;

compiling a list of attributes for the first user and the second user;
mapping the context to the list of attributes;
determining, by a second trained machine learning model and based on the list of attributes, a physical world hierarchy between the first user and the second user; and
determining a response to the second command using the physical world hierarchy; and
performing the response.

2. The method of claim 1, further comprising identifying, by the second trained machine learning model, a higher ranking user chosen from the group consisting of the first user and the second user.

3. The method of claim 2, further comprising:
receiving a correction from the higher ranking user;
maintaining a history of first commands, second commands, and corrections; and
using the history to update the second machine learning model.

4. The method of claim 1, wherein:
the list of attributes is based on querying an enterprise directory for a first profile associated with the first user and a second profile associated with the second user; and
the second trained machine learning model further uses the mapping to dynamically determine the physical world hierarchy between the first user and the second user for the context.

5. The method of claim 3, further comprising using the history and the updated second machine learning model to identify a mistaken instruction.

6. The method of claim 4, wherein the first profile comprises previous relevant experience of the first user and wherein the second profile comprises previous relevant experience of the second user.

7. The method of claim 1, wherein the device is a voice controlled device; and wherein the first command and the second command comprise voice commands.

8. The method of claim 1, wherein the device is a gesture controlled device; and wherein the first command and the second command comprise gesture commands.

9. A voice-controlled device, comprising:
a processing unit; and
a memory coupled to the processing unit, wherein the memory contains program instructions executable by the processing unit to cause the processing unit to:
receive a first command from a first user;
receive a second command from a second user;
determine, by a first trained machine learning model, that the second command conflicts with the first command;
in response to determining the second command conflicts with the first command:
identify a context for one of the first commands and one of the second commands;
query an enterprise directory for a first profile associated with the first user and a second profile associated with the second user;
map the context to the first profile and the second profile;
determine, by a second trained machine learning model, a physical world hierarchy between the first user and the second user, wherein the second trained machine learning model further uses the mapping to dynamically determine the physical world hierarchy between the first user and the second user for the context; and
determine a response to the second command using the physical world hierarchy; and
perform the response.

10. The voice-controlled device of claim 9, further comprising identifying, by the second trained machine learning model, a higher ranking user chosen from the group consisting of the first user and the second user.

11. The voice-controlled device of claim 10, further comprising:
receiving a correction from the higher ranking user;
maintaining a history of first commands, second commands, and corrections; and
using the history to update the second machine learning model.

12. The voice-controlled device of claim 11, further comprising using the history and the updated second machine learning model to identify a mistaken instruction.

13. The voice-controlled device of claim 9, wherein the first profile comprises previous relevant experience of the first user and wherein the second profile comprises previous relevant experience of the second user.

14. A computer program product for voice-controlled device, the computer program product comprising a computer readable storage medium having program instructions embodied therewith, the program instructions executable by a processor to cause the processor to:
receive a first command from a first user;
receive a second command from a second user;
determine, by a first trained machine learning model, that the second command conflicts with the first command;
in response to determining the second command conflicts with the first command:
identifying a context for one of the first commands and one of the second commands;
querying an enterprise directory for a first profile associated with the first user and a second profile associated with the second user;
mapping the context to the first profile and the second profile;
determine, by a second trained machine learning model, a physical world hierarchy between the first user and the second user, wherein the second trained machine learning model further uses the mapping to dynamically determine the physical world hierarchy between the first user and the second user for the context; and
determine a response to the second command using the physical world hierarchy; and
perform the response.

15. The computer program product of claim 14, further comprising identifying, by the second trained machine learning model, a higher ranking user chosen from the group consisting of the first user and the second user.

16. The computer program product of claim 15, further comprising:
receiving a correction from the higher ranking user;
maintaining a history of first commands, second commands, and corrections; and
using the history to update the second machine learning model.

17. The computer program product of claim 16, further comprising using the history and the updated second machine learning model to identify a mistaken instruction.

18. The computer program product of claim 14, wherein the first profile comprises previous relevant experience of the first user and wherein the second profile comprises previous relevant experience of the second user.

\* \* \* \* \*